Feb. 3, 1942.   P. M. HONNELL ET AL   2,271,864
SEISMIC WAVE DETECTOR
Filed June 10, 1938
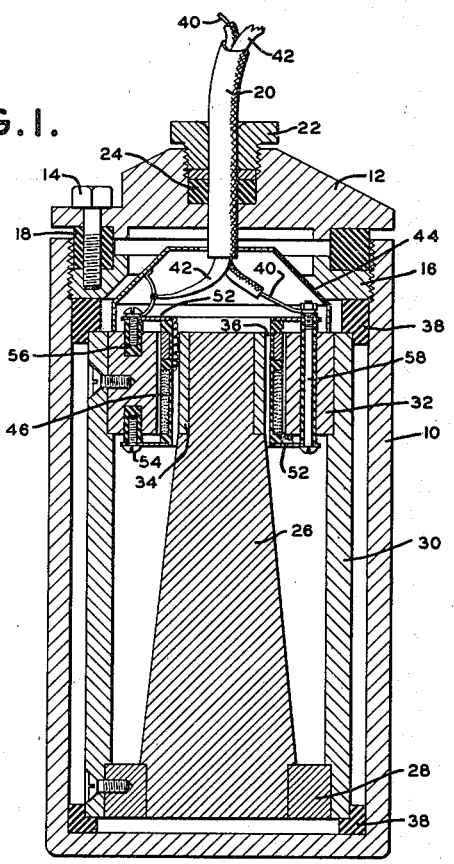
FIG. 1.
FIG. 3.
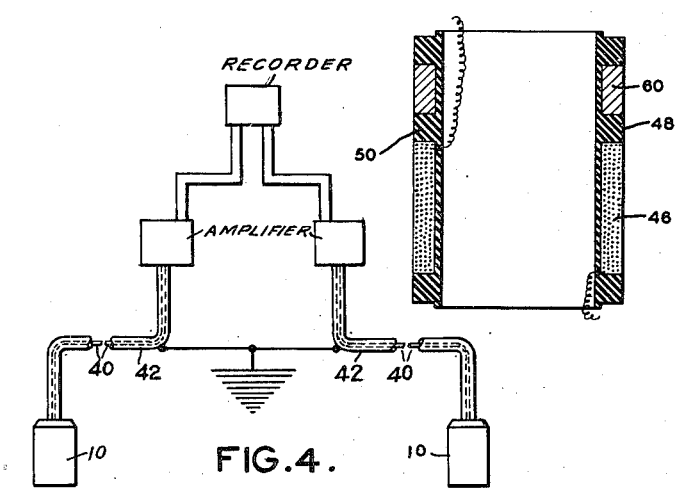
FIG. 2.
FIG. 4.
P.M. HONNELL
L.W. DICKERSON
INVENTORS
BY R. J. Dearborn
Daniel Stryker
ATTORNEYS Patented Feb. 3, 1942

2,271,864

UNITED STATES PATENT OFFICE 2,271,864

SEISMIC WAVE DETECTOR

Pierre M. Honnell and Lin W. Dickerson, Houston, Tex., assignors, by mesne assignments, to The Texas Company, New York, N. Y., a corporation of Delaware Application June 10, 1938, Serial No. 212,980

3 Claims. (Cl. 177—352)

This invention relates to instruments for detecting seismic waves of the type used in earth exploration, and more particularly to a completely shielded seismic wave detector capable of being used in the immediate vicinity of electric power transmission lines or other interfering electrical or magnetic devices.

The intensive nature of present day geophysical prospecting for possible ore deposits and oil bearing structures demands the most advanced design of geophysical instruments and this is especially true of seismic wave detectors. These instruments should be of small physical dimensions, be efficient transducers of seismic waves or vibrations into electromotive forces, have electrodynamic damping independent of temperature variations and be completely shielded from all stray electromagnetic and electrostatic fields which tend to obstruct the seismic record.

The principal object of the invention is the provision of a seismic wave detector which will meet the foregoing requirements, which will be simple of construction and will consequently have a low manufacturing cost. A second object is to provide such an instrument which will be more efficiently shielded both electromagnetically and electrostatically than those which have been used heretofore.

In carrying out the invention a magnetic circuit is so formed as to enclose and electrostatically shield the moving parts of the instrument. The magnetic circuit and shield is in turn mounted within and electrically insulated from an outer casing which latter is adapted to be placed in contact with the earth and which casing forms an electromagnetic shield for the instrument. A suspended coil system containing an output electromotive force coil is mounted in an airgap between the poles of the magnetic circuit and also includes a single turn or ring of non-magnetic material which serves to dampen the relative movement between the suspended coil system and the rest of the instrument.

For a better understanding of the invention, reference may be had to the accompanying drawing in which Figure 1 is a vertical sectional elevation through the instrument, Figure 2 is a vertical sectional elevation through the suspended coil of the detector, Figure 3 is a cross-sectional view through the cable lead and Figure 4 is a diagrammatic view showing the manner of electro-statically shielding a system comprising two detectors and amplifiers connected to a recorder.

Referring to the drawing, the detector comprises three major parts; an external soft iron water-tight casing, a magnetic circuit having a centrally located permanent magnet and an air gap, and a suspended coil system including the output E. M. F. coil and the damping ring, the system being suspended in the air gap by means of resilient supports.

The outer casing 10 which is adapted to be buried in the earth is constructed of high permeability soft iron which provides an effective electromagnetic shield so that the instrument contained therein will not be affected when operating highly sensitive seismic recording equipment in the vicinity, for instance, of electric transmission lines. The casing 10 is provided with a cover member 12 preferably of the same material and adapted to be secured in place by means of bolts 14 connected to an inner ring 16 threaded in the upper end of the casing. A rubber gasket 18 seals the joint between the casing 10 and the cover member 12 and a rubber covered cable 20 connected to the recording equipment (not shown) enters the instrument through a bushing 22 having a suitable rubber gasket 24.

The internal magnetic circuit or structure comprises a central cone-shaped permanent magnet 26 pressed into a ring 28 of high permeability iron, this ring being suitably secured to a surrounding cylindrical shell 30. A high permeability iron pole member 32 is secured within the upper end of the shell 30 and a high permeability annular pole-tip 34 is pressed or otherwise secured around the upper end of the magnet 26. A highly useful air-gap flux to leakage flux ratio is maintained by keeping the air gap reluctance to a low figure by using as close spacings as manufacturing tolerances will permit while at the same time keeping the leakage path reluctance as high as possible. High flux densities are further attained by shaping the permanent magnet pole 26 in the form of a frustum of a cone, thus increasing the net volume of permanent magnet material, and uniform flux density in the air gap 36 is obtained by means of the high permeability iron pole-tip 34 pressed on the magnet 26. It should be noted that the magnetic structure so far described not only serves as an efficient magnetic circuit but also inherently forms electromagnetic shielding against external magnetic fields, thus supplementing the shielding effect of the external casing 10. The internal magnet structure is electrically insulated from the external casing 10 as by means of rings 38 of a suitable phenolic condensation product.

The cable 20 comprises a lead 40 surrounded by electrical insulation 41 and a metallic shield 42 and the metallic shield is connected to an umbrella-shaped shield member 44 shown as secured to the pole piece 32 and surrounding the exposed end of the lead 40. Thus, with the detector cable shield 42 connected to the magnet structure, the high potential lead 40 and the output E. M. F. coil 46 to be described are completely enclosed and thereby shielded electrostatically. It is understood that several of the instruments described may be spread out over considerable territory and connected to the same amplifying and recording equipment as shown in Figure 4. With the construction disclosed, all of the shields, i. e., the surrounding magnet structures 26, 28, 30 and 34 and the cable shields 42 may be grounded at the same point on the earth's surface and in this manner ground currents which may be present at the places where the several detectors are located will not cause troublesome circulating currents in the detector leads.

The suspended coil system or inertia member 48, shown more clearly in Figure 2, comprises a core or bobbin 50 of electric insulating material around one portion of which is wound the output E. M. F. coil 46, preferably comprising several thousand turns of enameled insulated wire and constituting the element of the transducer which converts the seismic waves into electromotive forces which are then fed through the detector cable 20 to the recording equipment. The inertia member 48 is suspended in the air gap 36 between two resilient annular ring members 52 which members are in turn secured to opposite sides of the pole pieces 32 by means of screws 54 set in insulating bushings 56. The ring members 52 are preferably of a light spring metal although other materials such as leather may be suitable in some cases. One end of the coil 46 is attached to the lower ring 52 which is connected to the high potential lead 40 through the bolt 58. The other end of the coil 46 is attached to the upper ring 52 which in turn is connected to the cable shield 42 and to the shield member 44.

The necessary damping of the seismic pendulum is attained by means of a short circuated turn or ring 60 of copper, aluminum or other suitable non-magnetic metal having a high conductivity. The ring 60 is mounted on the core 50 so as to be within the air gap 36, and currents flowing in the ring 60 when relative movement exists between the inertia member 48 and the poles of the magnet produce a retarding or damping effect. By properly choosing the cross-sectional area and conductivity of the ring 60, the desired degree of damping for any particular seismic work is readily obtained.

The mass of the inertia member 48 together with the elastic properties of the supporting rings 52 form the seismic "pendulum." The rings 52 serve to restrict the motion of the inertia member to an axial direction, to center the inertia member in the air gap and, as it has been described hereinbefore, to form the return conductors from the output E. M. F. coil 46 to the detector cable 20. The natural undamped resonant frequency of the seismic pendulum is adjusted by varying the spring material and thickness of the rings 52 to that required for the particular type of seismic work to be performed. A low natural resonant frquency of the order of perhaps 10 cycles per second is usually used for refraction shooting while a natural resonant frequency in the frequency range of reflected seismic waves of between 30 and 60 cycles per second may be used for reflection shooting.

It is believed that the operation of the device will be clear from the foregoing description. Seismic waves in the earth will cause the casing 10 and the magnetic circuit mounted therein to vibrate. The suspended coil system 48 will tend to remain fixed because of its inertia and the resulting relative movement between the coil 46 and the pole pieces 32 and 34 will cause an E. M. F. to be generated and to pass through the cable 20 to the indicating or recording equipment (not shown). It is thus seen that a seismic wave detector has been devised having both electromagnetic and electrostatic shielding, having wide latitude in the choice of damping and impedance characteristics and which can be manufactured at relatively low cost. Due to its simplicity, large numbers of units can be made to match in phase and amplitude over the useful frequency range, and this is obviously an important characteristic in commercial practice. While the invention relates specifically to a detector for earth exploration, the device is equally applicable for use in the measurement of vibration in buildings, machinery and other structures, or as a detector for vibrations in the auditory range for use in mines and the like.

Obviously many modifications and variations of the invention may be made without departing from the spirit and scope thereof, and therefore only such limitations should be imposed as are indicated by the appended claims.

We claim:

1. In a vibration detector having a magnet unit comprising a magnet and pole pieces forming an air gap therebetween, an output coil and means for resiliently suspending said coil entirely within said air gap, a casing of magnetic material for said magnet unit, said casing forming a magnetic shield for said unit, means for insulating said magnet unit from said casing, and a two lead output cable for said coil, one of said leads forming a shield for the other lead and electrically connected to the magnet unit, the arrangement being such that the magnet unit and shielded cable lead form an electrostatic shield for said output coil.

2. In a vibration detector, a casing of magnetic material, a magnet unit within said casing, said magnet unit including a permanent magnet, a soft iron cylinder member surrounding said magnet and secured at one end to one end of said magnet, pole pieces secured to said magnet and said cylinder member so as to form an air gap therebetween, means for mounting said unit rigidly within and insulated from said casing so that the casing will form an electromagnetic shield for said magnet unit, an output coil resiliently suspended in said air gap, and responsive to variations in flux produced by relative movement between said coil and said magnet unit, and a two lead output cable for said coil, one of said leads forming a shield for the other lead and being electrically connected to the magnet unit the arrangement being such that the soft iron cylinder member of said magnet unit and said cable shield will form an electrostatic shield for said output coil.

3. In a vibration detector, a casing of magnetic material, a magnet unit within said casing, said magnet unit including a permanent magnet, a soft iron cylinder member surrounding said magnet and secured at one end to one end of said magnet, pole pieces secured to said magent and said cylinder member so as to form an air gap therebetween, means for mounting said unit rigidly within and insulated from said casing, an output coil, means for resiliently suspending said coil within said air gap, a cable having a lead connected to one end of said coil and extending outwardly of said casing, a shield around said cable, said cable shield being electrically connected to the other end of said coil and to said magnet unit, a shield member secured to said magnet unit and substantially enclosing the open end of said unit and the end of said lead, the arrangement being such that said cylinder member, said shield member and said cable shield will form an electrostatic shield for said output coil and said lead while said casing will form an electromagnetic shield for said magnet unit and output coil.

PIERRE M. HONNELL.
LIN W. DICKERSON.